United States Patent [19]

Kratt et al.

[11] 3,937,924

[45] Feb. 10, 1976

[54] SYSTEM FOR COLLECTING DATA

[75] Inventors: Kurt Wilhelm Kratt, Aldingen; Alois Bolsinger, Spaichingen, both of Germany

[73] Assignee: J. Hengstler K.G., Aldingen, Germany

[22] Filed: Aug. 5, 1974

[21] Appl. No.: 494,570

[30] Foreign Application Priority Data

Aug. 16, 1973 Germany ............................ 2341284

[52] U.S. Cl.235/61.6 R; 235/61.11 B; 235/61.12 R; 235/92 T

[51] Int. Cl.²G06K 15/18; G06K 7/00; G06K 19/04; G06F 7/38

[58] Field of Search ........ 235/61.8 R, 61.6 R, 92 H, 235/92 T, 92 SA, 92 B, 61.6 F, 61.6 G, 61.6 L; 346/146, 52, 53

[56] References Cited

UNITED STATES PATENTS

| | | | |
|---|---|---|---|
| 2,368,761 | 2/1945 | Hogan | 235/92 T |
| 2,545,460 | 3/1951 | Hall | 235/61.8 R |
| 3,644,711 | 2/1972 | Haller | 235/92 B |

*Primary Examiner*—Daryl W. Cook

[57] ABSTRACT

A plurality of counters are removably held by counter holder means at predetermined locations. Each counter is adapted to perform incremental and decremental counting operations. A program timer is operable to produce first and second control signals in alternation in accordance with a predetermined time schedule. Drive means are carried by said counter holder means and comprise drive output means and are operable under control of said program timer to rotate said drive output means in a decremental sense when said control timer produces said first control signal and in an incremental sense when said control timer produces said second control signal. A plurality of clutch means are carried by said counter holder means and connected to said drive output means and associated each with one of said counters. Each of said clutch means is adapted to assume a first state for driving the associated counter in an incremental sense and a second state for driving the associated counter in a decremental sense. A plurality of code detectors are provided, each of which is associated with one of said counters and comprises code detector elements and is adapted to receive an identification code carrier in a predetermined position and to assume a first state in response to an insertion of a mating identification code carrier having code elements, which represent the same code as said code detector elements, and a second state in response to the removal of such mating identification code carrier. A plurality of clutch-shifting means are carried by said counter holder means and associated with respective ones of said clutch means and of said code detectors and adapted to cause the associated clutch means to assume said first and second states in response to said first and second states, respectively, of the associated code detector.

32 Claims, 12 Drawing Figures

SYSTEM FOR COLLECTING DATA

This invention relates to a system for collecting data, particularly data relating to sliding working hours, by means of counters, which can be rendered operative and inoperative by means of identification code carriers.

Known systems for collecting data comprise counters, which are controlled mechanically or by electric pulses. Counters are known, which are driven by synchronous motors and are started by means of mechanical clutches. All these data-collecting counters are incremental counters, which are read at the end of an accounting period and are then reset. For this reason, the actual time of attendance must be compared with a schedule of the prescribed time of attendance so that the net balance can be calculated. This requires additional individual work.

In systems comprising pulse counters, the solenoids required in each counter and the wiring involve a high expenditure. Another disadvantage resides in the need for resetting means and for their actuation in use.

It is an object of the invention to eliminate the various disadvantages. This is accomplished according to the invention in that the net balance is directly indicated so that the need for individual calculations is eliminated. For this purpose, a system for collecting data, particularly data relating to sliding working hours, by means of counters, which are rendered operative and inoperative by identification code carriers, is characterized by the provision of drive means, which are controlled to operate alternately in mutually opposite senses of rotation in accordance with a timed program (program timer) and which are adapted to be connected to or disconnected from associated incremental and decremental counters in response to the insertion and removal of identification code carriers (identification cards) in such a manner that deviations from the predetermined timed program result in the counting of a net time balance in the respective counter. Incremental and decremental counters, which are adapted to be mechanically driven are adapted to be coupled to incremental or decremental drive means (solenoid or motor drive) in response to the insertion and removal of an identification code carrier. Three modes of operation are preferably provided for. If a common drive output member is provided, direction-controlling clutches may be provided so that the program-controlled reversal of the direction of rotation of the drive shaft results in a change of the counter from counting to standstill or vice versa, independently of the clutch position determined by the identification code carrier (identification card). In the first and second modes, the counter is coupled to the incremental and decremental drive means, respectively, in response to the insertion and removal of the identification card. In the third mode, the counter is uncoupled in response to the insertion of a disabling card.

In the system according to the invention, the net balance is directly indicated in each case because program-controlled switching operations and the indication of attendance by the inserted identity card result in an incremental or decremental counting operation. Because in accordance with the invention the prescribed time of attendance is counted as a reference, a separate comparison of time is no longer required because this comparison is continuously performed in that an attendance during a time, at which an attendance is not prescribed results in an incremental counting operation, an attendance during the prescribed time of attendance does not result in any counting operation, and an absence of an employee during the prescribed time of attendance results in a decremental counting operation. Because the net balance is continually updated, there will be no need for resetting the counter and no need for reading the counter for a calculation if the total time of attendance is within a permissible tolerance range.

The use of this arrangement and of mechanical drive means results in much lower costs per counter unit. Besides, the combination of a counter and a code detector in a plug-in unit results in a considerable saving of space which is of great advantage in large counter arrays.

Besides, the previously known systems for collecting data relating to sliding working hours by means of mechanical or electromechanical counters do not permit of a correction and times of absence owing to, e.g., a vacation, sickness or failure to insert the identity card, by error, have to be included in the calculation of the net balance.

In the system according to the invention this further disadvantage is eliminated in that the plug-in counter can be removed for receiving a correction of data so that these corrections may be performed from time to time in order to update the counters even in cases of irregular attendance and times of absence. This correcting device comprises drive means a preselector for selecting the desired number of incremental or decremental counting steps to be performed, and a counter holder provided with a clutch means for connection to the counter.

According to a further feature, a device for an automatic preparation of records may be coupled to the correcting device. These records then indicate the data and time when the correction has been made, the amount of the correction together with its sign (+ or —), a code number indicating the reason for the correction and, if desired, the identification code, which may be manually entered or is provided in coded form on the counter and is read therefrom.

To minimize the corrections, a special plug-in disabling card is provided, which disengages the clutch connected to the counter. The count will not be changed as long as this card is inserted. This special disabling card may be inserted during an absence for any reason whatever, such as a vacation sickness, etc. Suitable inscriptions or color codes may be used to indicate the reason for the absence of the employee concerned.

In a particularly desirable embodiment of the counter, the latter is provided with a known changeover shutter so that the deviation from zero together with the + or − sign is directly indicated. Known signalling means, such as contacts may be used to determine a time limit in both directions and to produce a signal when the limit is exceeded. Each clutch-shifting rocker for engaging the clutch when the counter has been inserted into our counter holder may be operatively connected to a push rod and and the holder block may be provided with contacts, which are operable by said push rods to produce signals, which indicate the condition of the counters and may be recorded, e.g., for electric data processing.

In the system according to the invention the plug-in counters are held in a holder block for a plurality of counters. This holder block comprises drive means, which are controlled by the program timer and a change-over switch controlled by said timer such a manner that the first drive means are inoperative during the prescribed time of attendance and the second drive means are operative in a decremental sense during the prescribed time of attendance whereas during the time, in which no attendance is prescribed the changeover switch is in the position for the other mode of operation, in which the first drive means are operative in an incremental sense and the second drive means are inoperative. Just as known electromechanical drive means for pulse counters, the drive means may consist, e.g., of stepping mechanisms operated by pulse-controlled solenoids. The expenditure will be reduced if a plurality of units are operated by one pair of solenoids.

Most of the drive means required for a mechanical transmission consist of identical parts, which are used more than once in the system so that the expenditure is lower than in known systems. The program timer may consist of a conventional program timer, provided that it can produce the signals required in the system according to the invention. Conventional program timers may be used. Day programs may be employed for simpler systems and complete month programs for larger systems. Various embodiments of systems for collecting data according to the invention are shown by way of example in the accompanying drawings, in which FIG. 1 is a diagrammatic view showing the means for driving the counters and the control means including a program timer.

Figure 1:
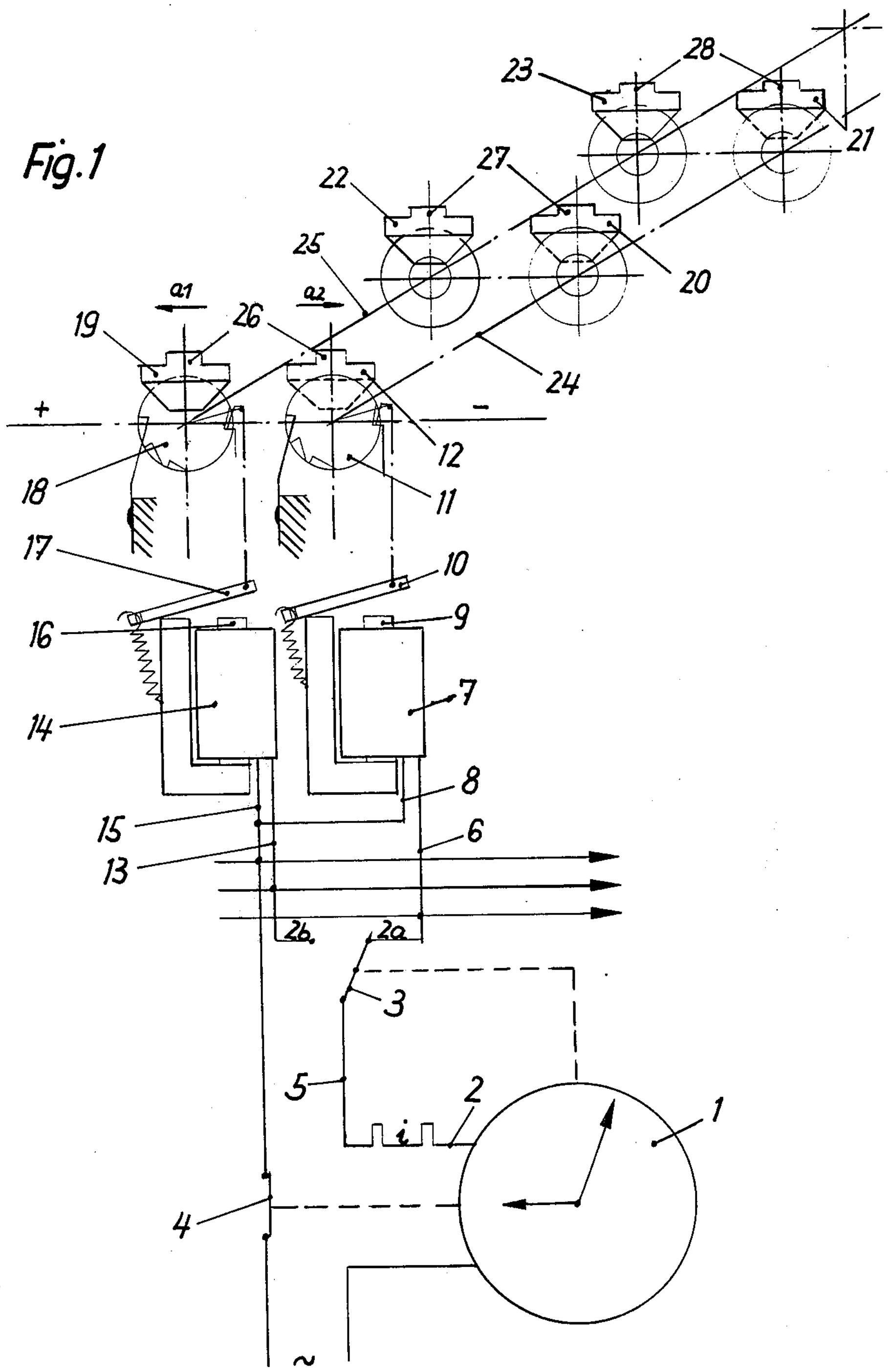

A program timer 1 shown in FIG. 1 has an output 2 for delivering clock pulses, e.g., one pulse per second, and is arranged to close the change-over switch 3 at its contact *Za* during the prescribed time of attendance and at its contact *Zb* during times, at which no attendance is prescribed. The system can be deenergized by the master switch 4 when the entire plant is closed, e.g., at night. In the system shown in FIG. 1 the program timer 1 controls the program-controlled change-over switch 3 and the master switch 4. The clock pulses are delivered from the output 2 via the clock line 5 to the change-over switch 3 and, when the latter is in the position shown, via contact *Za* and coil terminal 6 to coil 7, which is connected by its terminal 8 and the master switch 4 to the other terminal of the supply system. The clock pulses delivered by the program timer 1 at its output 2 result in a pulsed energization of the solenoid 9 so that the same repeatedly attracts its armature 10 and a pawl connected thereto intermittently rotates the ratchet 11. The rotation of the ratchet is transmitted to bevel gearing 12, which constitutes drive output means for intermittently driving connected counters in a counter-clockwise or decremental sense. This mode of operation is established during a prescribed time of attendance in accordance with the program.

During the other mode of operation the changeover switch 3 is connected via *Zb* and the coil terminal 13 to the coil 14, which has a second terminal 15, which is connected by the switch 4 to the supply system terminal. In this mode of operation, the click pulses delivered from the output 2 to the coil 14 energize the solenoid 16, which attracts its armature 17 so that a pawl connected thereto intermittently rotates the ratchet 18 and the rotation of the latter is transmitted to bevel gearing 19, which constitutes drive output means for intermittently driving connected counters in a clockwise or incremental sense. This mode of operation is established during times, at which no attendance is prescribed in accordance with the program.

The mechanism shown in FIGS. 1 including means the solenoids 9 and 16 and other elements of the drive means is provided only once in each holder block for a plurality of counters. Each counter holder block comprises for each counter drive output means 12, 20, 21, etc. for a counter-clockwise drive and drive output means 19, 22, 23 etc. for a clockwise drive. These drive output means consist of bevel gearings, which are driven by the ratchets associated therewith and shafts 24, 25, respectively. Each drive output means is provided with a clutch member 26, 27, 28 etc. for establishing a connection to respective counters, which are adapted to be inserted into the holder block and will be explained more fully with reference to FIGS. 2 et seq.

Figure 2:
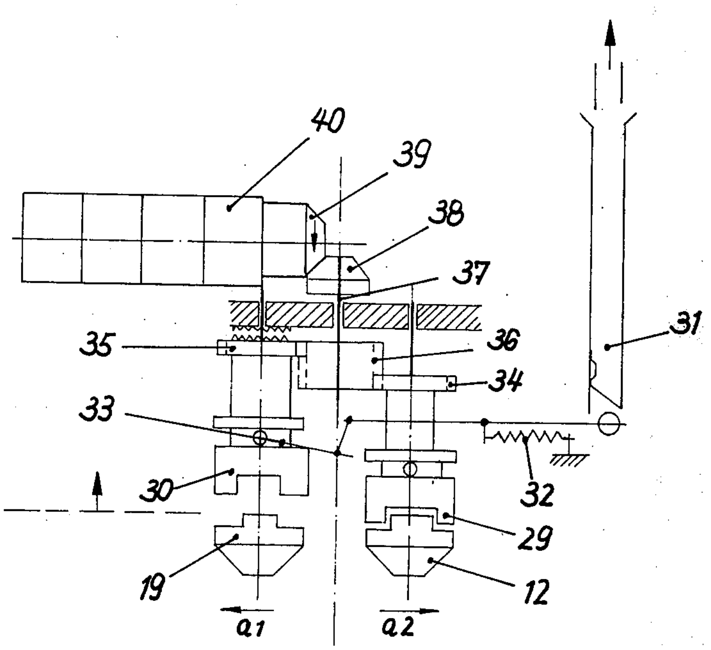
FIGS. 2 to 4 show diagrammatically the counters and the clutches for connecting them to different forward and reverse drive means with the clutches in different positions.

FIG. 2 shows also diagrammatically the means for driving the counters. The drive output means 12 etc. and 19 etc. of FIG. 1 are shown as well as the clutch members 29 and 30. When the clutch is in the position shown in FIG. 2 (When the identification code carrier or identity card 31 is not inserted), the angular position of the clutch-shifting rocker 33 is determined by the spring 32. In this position the clutch member 29 is connected to the drive output means 12 and the clutch member 30 is disengaged. Both clutch members 29 and 30 are connected to respective spur gears 34 and 35, which regardless of the position of the clutches are in mesh with a spur gear 36, which serves for the connection to the counter 40 by means of the shaft 37 and the bevel gearing 38, 39.

In accordance with the program, when the change-over switch 3 is closed at its contact *Za* during a prescribed time of attendance, the counters are driven in a counterclockwise or decremental sense when the employee is absent during this time.

Figure 3:
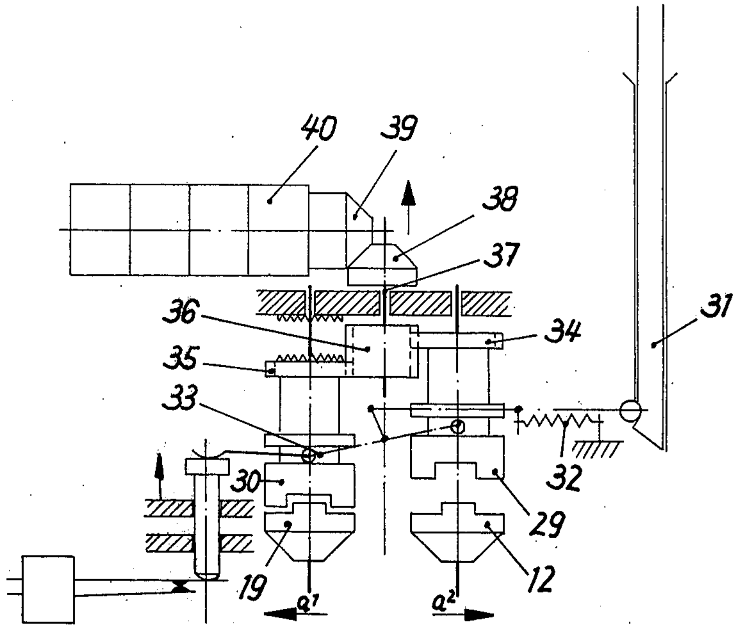

FIG. 3 shows the position of the clutches when the identification code carrier or identity card 31 has been inserted to turn the clutch-actuating rocker 33 to its second position, in which the clutch member 29 is disengaged and the clutch 30 is connected to the drive output means 19. The means for connecting the clutch members 29 and 30 to the counter 40 are similar to those described with reference to FIG. 2. When the system operates in the mode shown in FIG. 1, i.e., the change-over switch 3 is closed at its contact *Za* during prescribed times of attendance, the drive output means 19 will not be driven so that the count of the counter 40 will not be changed. When the employee is present during the prescribed time of attendance, there will be no counting operation and the net balance will not be changed.

During times, at which no attendance is prescribed, the program control causes the change-over switch 3 to be closed at its contact *Za* so that the drive output means 19 are intermittently rotated in a sense for incremental counting operations. When the employee is present during this time, in which an attendance is not prescribed, the counter 40 is driven in an incremental sense. This functional relationship between the mode of operation called for by the program and the control of the counter by the identity card inserted by the employee is apparent from a functional table at the end of the detailed description of the drawings.

Figure 4:
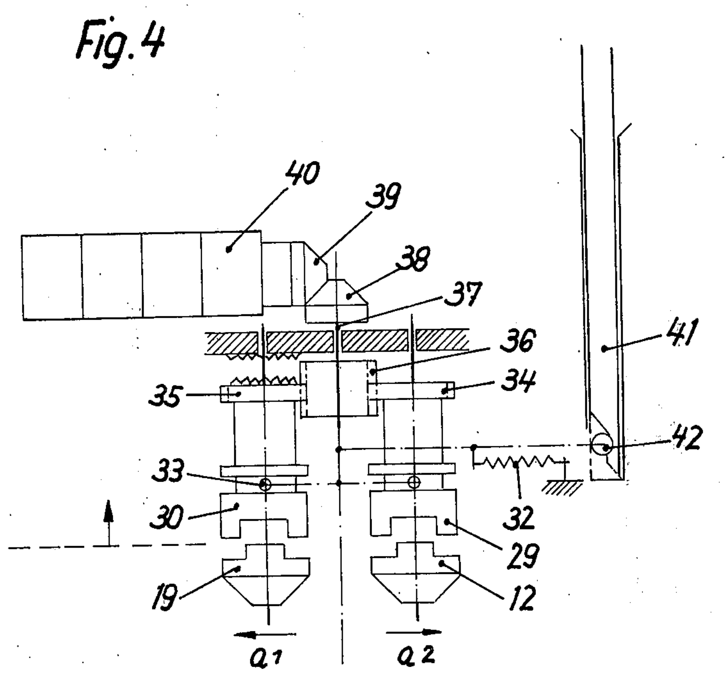

FIG. 4 shows how a special disabling card 41 may be used to move the rocker by means of a push rod to an intermediate position 42, in which both clutch members 29 and 30 are disengaged. In this embodiment providing for a disengagement of both clutches, each counter 40 can be disconnected by the insertion of the disabling card, e.g., in case of a prolonged absence due to a vacation, sickness, or business trip.

Figure 5:
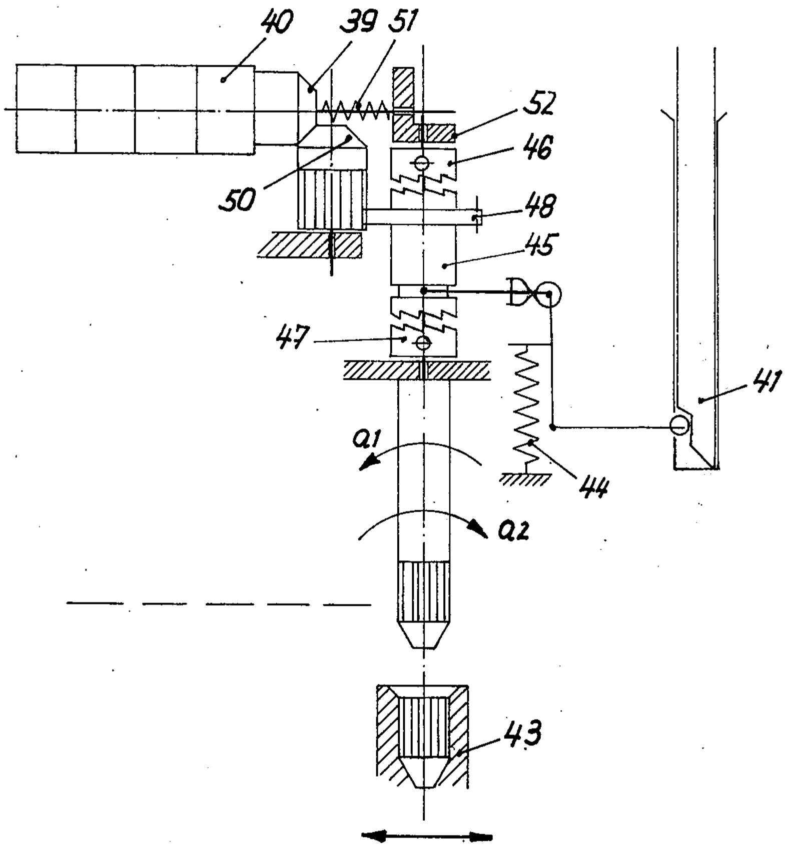
FIG. 5 is a diagrammatical view showing the counters and a reversible clutch for driving them in a system, in which each clutch is associated with common drive means for incremental and decremental counting operations.

FIG. 5 shows another embodiment of a clutch. Drive means 43 are provided, which are connected to a single shaft and in accordance with a program drive said shaft in different senses of rotation in alternation. When the disabling card 41 is inserted, the clutch member 45 is in its intermediate position shown in the drawing. The spring 44 tends to engage the clutch member 45 with the clutch member 46 when no identification code carrier or identity card is inserted. In response to the insertion of an identification code carrier or identity card, the clutch member 45 engages the clutch member 47. Each clutch member 46 and 47 is adapted to drive the clutch member 45 only in one of two opposite senses of rotation. The rotation of the clutch member 45 is transmitted to the counter 40 by means of spur gears 48 and 49 and bevel gears 50 and 39. To ensure that the counter 40 can be driven by one of the one-way clutches 46/45 or 47/45 only when this is desired, a braking spring consisting of an axial compression spring 51 is provided. The abutment 52 provided for said spring serves also to mount the drive shaft and the countershaft.

Figure 6:
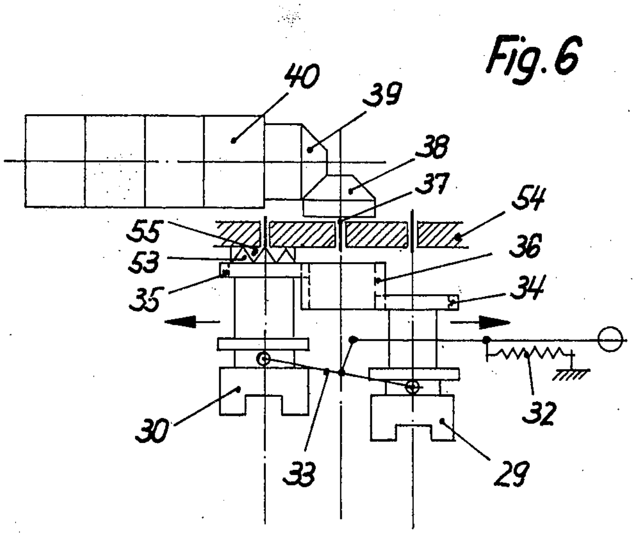
FIGS. 6 and 7 are diagrammatic views showing details of the system disposed on the counter side and clutch side, respectively.

FIG. 6 shows detent means, which become effective when the plug-in counter has been removed. Detent teeth 53 are provided on the clutch member 30 and when the counter 40 has been removed interengage with detent teeth 55 fixed to the housing 54 so that the clutch member 30 is locked when the counter 40 has been pulled. This arrangement ensures that the position of the clutch member 30 and of the clutch member 29, which is connected to the clutch member 30 by the spur gears 34, 35, 36, will not be changed during the removal of the counter from the holder block and during the insertion of the counter into the holder block, e.g., when the counter is to be or had been inserted into a correcting device. Is is also ensured that the clutch members 29 and 30 are in the position required for their connection to the drive output means 12 and 19, respectively.

Figure 7:
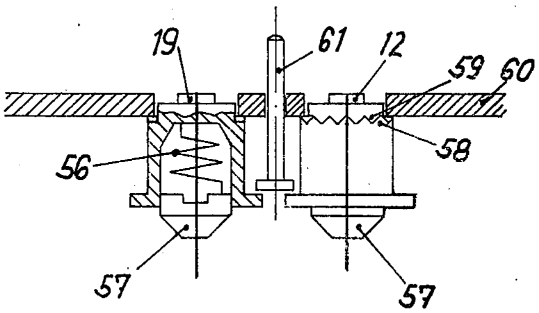

FIG. 7 shows also diagrammatically a detail including specially arranged drive output means 12 and 19. An energy storage spring 56 is provided between each output bevel gear 57 and the associated drive output means 12 or 19, which is provided with detent teeth 58. When the counter has been removed, the pin 61 gives way to permit of an interengagement between the detent teeth 58 and detent teeth 59 fixed to the holder block 60. This arrangement ensures that when the counter has been removed for a short time any counting pulses received during this time will stress the energy storage spring and will be transmitted by the latter to the counter when the same has been reinserted.

Figure 8:
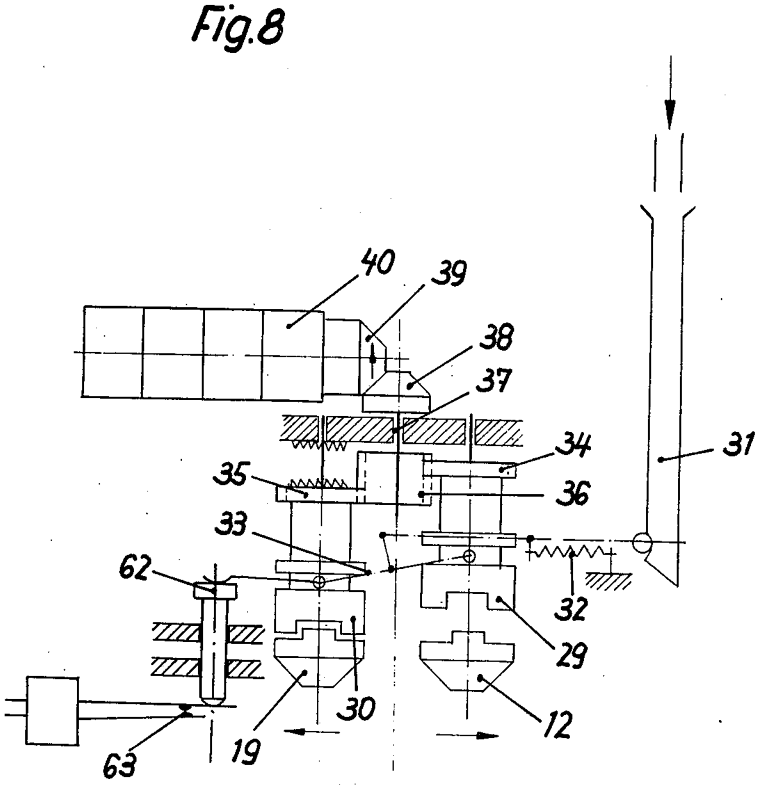
FIG. 8 is a diagrammatic view showing the counters and clutches of another embodiment.

FIG. 8 shows a further embodiment of the invention. A push rod 62 is provided, which is operable by the clutch-shifting rocker 33 shown also in FIGS. 1 to 4. In response to the movement of the rocker 33, the push rod 62 controls the contact 63, which is mounted in the holder block. Such contact 63 may be associated with each counter and may be used, e.g., to control recording means.

Figure 9:
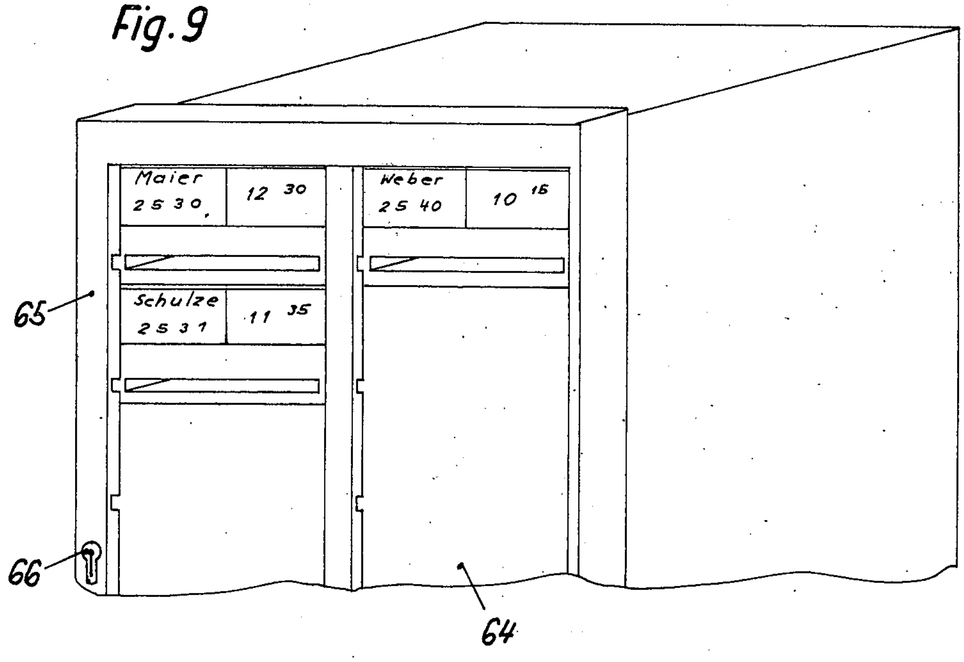
FIGS. 9 and 10 are diagrammatic views showing in elevation and in a sectional view, respectively, the upper portion of a complete system.

FIG. 9 shows part of a complete appliance comprising a holder block 64 for the counters, a frame 65 and a built-in lock 66 for preventing an unauthorized removal of the plug-in counters.

Figure 10:
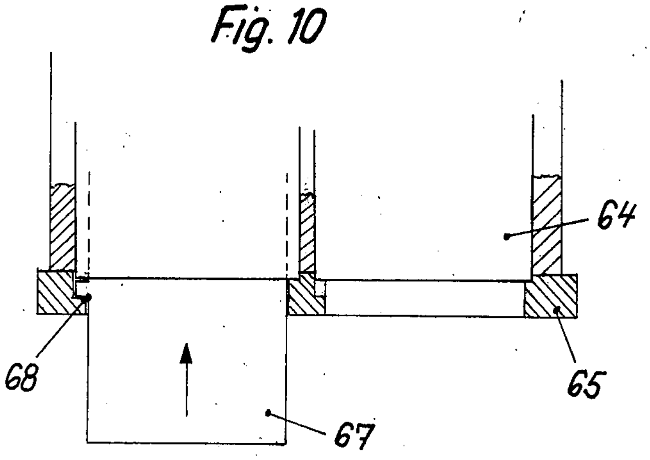

FIG. 10 shows also a disabling card 67, which is provided with a nose 68 and is also locked by the lockable frame 65.

Figure 11:
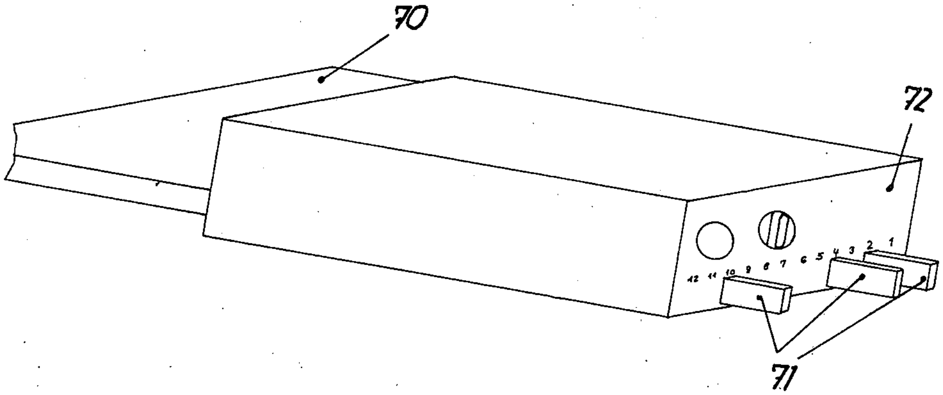
FIGS. 11 and 12 are diagrammatic views showing in elevation and in a sectional view, respectively, a plug-in counter provided with identification code elements.
Figure 12:
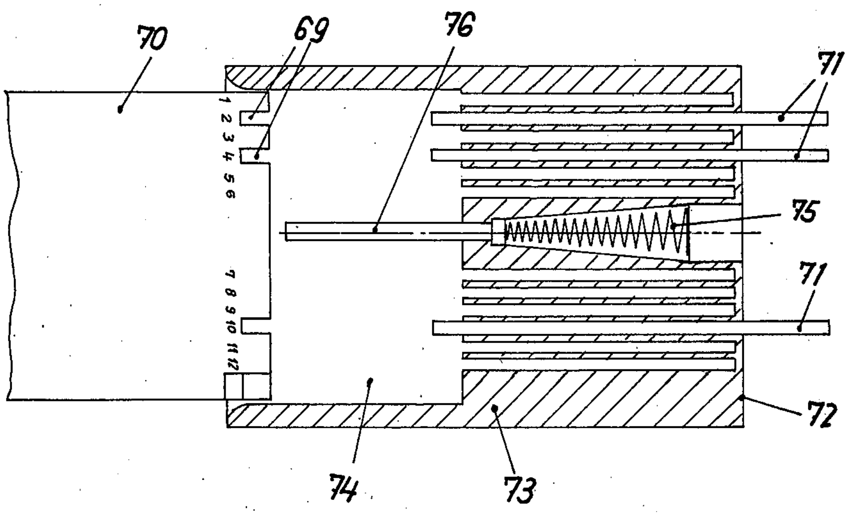

FIGS. 11 and 12 show an extended version of identification code elements consisting of marginal slots 69 in an identification code carrier or identity card 70. The clutch, which is not shown here, can be actuated only if these marginal slots 69 agree with the code plates 71, which protrude from the counter unit 73 on the plug-in end 72 thereof and which are adapted to actuate contacts provided in the correcting deivce. In this way the code can be detected so that the counter unit is identified for the automatic preparation of a record of the correcting operation, which will be described hereinafter. The counter unit 73 has an opening 74 for receiving the identification code carrier or identity card 70. An ejector 76, which is cushioned by a spring 75, is disposed in the opening 74 and serves to eject an identity card, which has not been inserted to the required position. This ejection feature prevents an impression of the user that the card has been properly inserted whereas in fact the clutch has not been shifted. The identity card is held in the counter only when it has been locked in position so that the clutch is also shifted whereas the card is ejected when it has not been inserted as far as required and this ejection is apparent to the person who has inserted the card. Because the counter units 73 are plug-in units and the clutch members 29, 30, can be disconnected from the drive output means 12, 19, the mechanical drive means may also be used to correct the count.

As an illustrative embodiment of the function, a sequence I will now be described and represented in the following table.

An employee arrives at 6.00 hours (B), takes a lunch break from 12.30 hours (E) to 14.15 hours (B), and works in the afternoon until 17.00 hours (E).

The program timer is set for prescribed times of attendance from 7.00 hours to 12.00 hours and from 13.30 hours to 16.30 hours, i.e., for a total time of attendance of 8 hours.

When the program causes the change-over switch to be closed at its contact *Zb* (FIG. 1), the employee inserts his identity card when he begins to work at 6.00 hours (B) so that the clutch assumes the position shown in FIG. 3 for an incremental counting operation.

At 7.00, the program timer shifts the change-over switch from *Zb* to *Za* (FIG. 1) so that there will be no counting operation because the clutch remains in the position shown in FIG. 3. The count will remain unchanged until the program timer shifts the change-over switch 3 from its contact *Za* to its contact *Zb* (FIG. 1) at 12.00 hours so that the counter is operated in an incremental sense because the employee is still present and the clutch remains in the position shown in FIG. 3.

When the employee leaves at 12.30 (E), he removes

-continued

| Standard Time hours | Net Balance hours | minutes |
|---|---|---|
| 7.00 | +01 | 00 |
| 12.00 | +01 | 00 |
| 12.30 | +01 | 30 |
| 13.30 | +01 | 30 |
| 14.15 | +00 | 45 |
| 16.30 | +00 | 45 |
| 17.00 | +01 | 15 |

Sequence I and additional sequences II to IV are represented in the following Table.

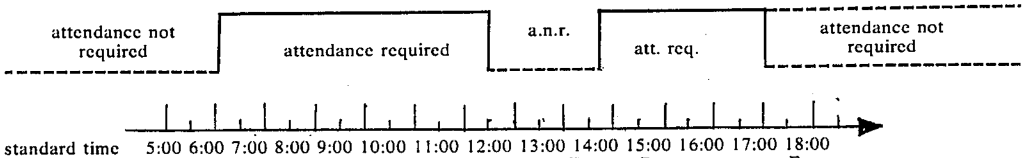

| | | |
|---|---|---|
| standard time | 5:00 6:00 7:00 8:00 9:00 10:00 11:00 12:00 13:00 14:00 15:00 16:00 17:00 18:00 | |
| | B E B E | |
| Sequence I | ...ooo.+++.OOOOOOOOOOOOOOOOOOOO.+.ooo.−−.OOOOOOOO.+.oooo... | = net balance $1^{15}$+ |
| | B E B E | |
| Sequence II | ...ooooooo.OOOOOOOOOOOOOOOOOOOO.ooooo.OOOOOOOOOOO.oooooo... | = net balance 0 |
| | B E B E | |
| Sequence III | ...ooooooo.OOOOOOOOOOOOOOO.———.ooo.+.OOOOOOOO.—−.oooooo... | = net balance $1^{30}$− |
| | B E B E | |
| Sequence IV | ...oooooo..00000000000000000000.ooooo.00000000000 .oooo... | = net balance $0^{45}$+ |

B = beginning
E = end
O = no counting operation
+ = incremental counting operation
− = decremental counting operation
. = change of operating conditions his identity card so that the clutch is moved to the position shown in FIG. 2 and the counting operation is not continued as the switch 3 is closed at its contact *Zb* (FIG. 1).

At 13.30, the program timer causes the switch 3 to shift from its contact *Zb* to its contact *Za* (FIG. 1). Because the employee is not yet present, the fact that the switch 3 is closed at its contact *Za* (FIG. 1) and the clutch is in the position shown in FIG. 2 result in a decremental counting operation. When the employee returns, he inserts his identity card so that the clutch assumes the position shown in FIG. 3 and there is no counting operation.

When the prescribed time of attendance is terminated at 16.30 hours, the program timer shifts the switch from its contact *Za* to its contact *Zb* (FIG. 1). Because the identity card is still inserted, the clutch assumes the position shown in FIG. 3 and the counter counts now in an incremental sense until the identity card is removed at 17.00 so that the clutch assumes the position shown in FIG. 2 and the counter is stopped.

In this example, the actual time of attendance of the employee is calculated as follows:

| | | |
|---|---|---|
| 6.00 (B) to 12.30 (E) | = | 6 hours 30 minutes |
| 14.15 (B) to 17.00 (E) | = | 2 hours 45 minutes |
| Total time of attendance | | 9 hours 15 minutes |

In sequence I, the counter will indicate the following net balance during the day, beginning with a net balance of 0 hours 00 minutes.

| Standard Time hours | Net Balance hours | minutes |
|---|---|---|
| 6.00 | +00 | 00 |

What is claimed is:

1. A system for collecting data, which comprises counter holder means, a plurality of counters, which are removably held by said counter holder means at predetermined locations, each of said counters being adapted to perform incremental and decremental counting operations, a program timer operable to produce first and second control signals in alternation in accordance with a predetermined time schedule, drive means carried by said counter holder means and comprising drive output means and operable under control of said program timer to rotate said drive output means in a decremental sense when said control timer produces said first control signal and in an incremental sense when said control produces said second control signal, a plurality of clutch means carried by said counter holder means and connected to said drive output means and associated each with one of said counters, each of said clutch means being adapted to assume a first state for driving the associated counter in an incremental sense and a second state for driving the associated counter in a decremental sense, a plurality of code detectors, each of which is associated with one of said counters and comprises code detector elements and is adapted to receive an identification code carrier in a predetermined position and to assume a first state in response to an insertion of a mating identification code carrier having code elements, which represent the same code as said code detector elements, and a second state in response to the removal of such mating identification code carrier, and a plurality of clutch-shifting means, which are carried by said counter holder means and associated with respective ones of said clutch means and of said code detectors and adapted to cause the associated clutch means to assume said first and second states in response to the first and second states, respectively, of the associated code detector.

2. A system as set forth in claim 1, in which
each of said code detectors is adapted to receive a disabling code carrier and
each of said clutch means is arranged to assume a third state in response to the receipt of said disabling code carrier by the associated code detector and to disconnect in said third state the associated counter from said drive output means.

3. A system as set forth in claim 2, which comprises means for locking said counter holders and any of said disabling code carriers in the code detectors, which has received said disabling code carrier to prevent an unauthorized removal of said counter and disabling code carrier.

4. A system as set forth in claim 2, in which said identification code carriers differ in appearance from said disabling code carriers.

5. A system as set forth in claim 1, in which
said drive means comprise drive output means consisting of a shaft and are adapted to rotate said shaft in a said decremental and incremental senses under control of said program timer,
each of said clutch means comprises first and second input members non-rotatably connected to said shaft at axially spaced apart positions, and an output member rotatably and axially slidably mounted on said shaft between said first and second input members and arranged to be held in engagement with said first input member in said first state of said clutch means and with said second input member in said second state of said clutch means,
said first input member is adapted to rotate said output member only in an incremental sense, and
said second input member is adapted to rotate said output member only in a decremental sense.

6. A system as set forth in claim 1, in which
said counters are plug-in counters,
means are provided for locking said counters in said holder means,
means are provided for locking clutch means in position when the associated counter has been removed, and
an energy storage spring is associated with each clutch means and adapted to receive energy from said drive means when the associated counter has been removed from said counter holder means and for transmitting said energy to the associated counter when the same has been reinserted into said holder means.

7. A system as set forth in claim 1, in which
said drive output means comprise a shaft connected to said clutch means and
said drive means comprise a ratchet wheel non-rotatably connected to said shaft, a pawl operable to rotate said ratchet, and a solenoid energizable to operate said pawl.

8. A system as set forth in claim 1, in which
said drive output means comprise an output shaft,
said drive means comprise a second shaft, a reversing transmission connecting said second shaft to said output shaft, two ratchet wheels, which are nonrotatably connected to said output shaft and second shaft, respectively, two pawls, which are associated with respective ones of said ratchets and operable to intermittently rotate the same in incremental and decremental senses, respectively, and two solenoids, each of which is intermittently energizable to operate one of said pawls, one of said pawls, one of said solenoids being energizable when said program timer produces said first control signal and the other of said solenoids being energizable when said program timer produces said second control signal.

9. A system as set forth in claim 1, in which
said drive output means comprise a first output shaft for rotation in said incremental sense and a second output shaft for rotation in said decremental sense, and in which
said drive means compirse first and ratchet wheels non-rotatably connected to said first and second output shafts, respectively, first and second pawls operable to rotate said first and second ratchets, respectively, in incremental and decremental senses, respectively, and first and second solenoids energizable to operate said first and second pawls, respectively said first solenoid being energizable when said program timer produces said second control signal and said second solenoid being energizable when said program timer produces said first control signal.

10. A system as set forth in claim 1, in which
said drive means comprise incremental drive means energizable to rotate in an incremental sense and decremental drive means energizable to rotate in a decremental sense,
an energizing pulse source is provided and
a change-over switch is provided to connect said energizing pulse source to said incrmental drive means when said program timer produces said second control signal and to said decremental drive means when said program timer produces said first control signal.

11. A system as set forth in claim 10, which comprises a master switch for controlling the energization of the system.

12. A system as set forth in claim 10, in which said program timer comprises
a clock including an energy storage device,
a pulse generator,
an amplifier,
an input for connecting said system to an external power source, and
battery means for energizing said system in case of a failure of said power source.

13. A ststem as set forth in claim 1, in which each of said clutch means comprises input means operatively connected to said drive output means and output means adapted to be mechanically connected to the associated counter and engageable with and disengageable from said input means under control of said clutchshifting means.

14. A system as set forth in claim 1, in which each of said clutch-shifting means comprises a rocker, which is pivotally movable between two positions to cause the associated clutch means to assume their said first state in response to the first state of said code detector and their second state in response to the second state of said code detector.

15. A system as set forth in claim 14, which comprises signalling means carried by said holder means and associated with respective ones of said counters and controlled by the associated rocker.

16. A system as set forth in claim 14, in which
said signalling means comprise contact means and
a push rod adapted to operate said cntact means is connected to said rocker.

17. A system as set forth in claim 1, which comprises a correcting device for correcting the count of one of said counters by a predetermined counting operation when said counter has been removed from said counter holder means, which correcting device comprises
an adapter adapted to receive each of said counters, and
means for preselecting a predetermined counting operation as to the number of counting steps and the sense thereof.

18. A system as set forth in claim 17, in which said correcting device comprises
correction-initiating means for initiating the preselected counting operation and
correction-terminating means for automatically disabling said correcting device when said predetermined counting operation has been performed.

19. A system as set forth in claim 18, in which said correction-initiating means are manually operable.

20. A system as set forth in claim 18, in which said correction-inititating means are automatically operable.

21. A system as set forth in claim 17, which comprises
a data storage device and in which
said correcting device coprises a read-out, which is connected to said data storage device and adapted to deliver data representing the correcting operation to said data storage device for storage therein.

22. A system as set forth in claim 21, in which said data storage device comprises a printer.

23. A system as set forth in claim 21, in which said data storage device comprises a tape perforator.

24. A system as set forth in claim 21, in which said data storage device comprises a magnetic tape recorder.

25. A system as set forth in claim 21, in which
each of said code detectors is combined with the associated counter in a unit, said code detector elements of each of said code detectors represents a code is specific to said code detector, and
said correcting device is adapted to detect said code and to deliver data representing said code to said data storage device for storage therein.

26. A system as set forth in claim 25, in which said correcting device comprises contacts for detecting said code.

27. A system as set forth in claim 1, in which
each of said code detectors is combined with the associated counter in a unit, and
said code detector elements of different ones of said code detectors represent different codes.

28. A system as set fort in claim 1, in which
each of said counters comprises a first set of digit wheels for indicating counts above zero, a second set of digit wheels for indicating counts below zero,
each of said counters comprises also a shutter, which is arranged to assume a first position when the count is above zero and in said first position exposes the digit wheels of said first set and covers the digit wheels of said second set, and to assume a second position when the count is below zero and in said second position exposes the digit wheels of said second set and covers the digit wheels of said first set.

29. A system as set forth in claim 25, in which the numerals of the digits wheels of said first set distinguish in appearance from those of the digits wheels of the second set.

30. A system as set forth in claim 29, in which
the digits wheels of the first set carry white numerals and
the digit wheels of the second set carry red numerals.

31. A system as set forth in claim 1, which comprises means for locking said counter in said counter holder means to prevent an unauthorized removal.

32. A system as set forth in claim 1, in which
each of said code detectors is provided with a slot adapted to receive said mating identification code carrier in said predetermined position,
detent means are provided to releasably lock said mating identification code carrier in said predetermined position and
spring means are provided for ejecting said identification code carrier from said slot when the identification code carrier has been inserted into said slot and released short of said predetermined position.

* * * * *